(12) United States Patent
Meier et al.

(10) Patent No.: US 10,077,359 B2
(45) Date of Patent: Sep. 18, 2018

(54) FLAME-RETARDANT, HIGH TEMPERATURE RESISTANT THERMOSETS ON THE BASIS OF NAPHTHALENE-BASED EPOXY RESINS AND CYANATE ESTERS

(71) Applicant: Airbus Defence and Space GmbH, Taufkirchen (DE)

(72) Inventors: Christoph Meier, München (DE); Patricia Parlevliet, München (DE); Manfred Doering, Woerth am Rhein (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 0 days.

(21) Appl. No.: 15/198,831

(22) Filed: Jun. 30, 2016

(65) Prior Publication Data

US 2017/0002191 A1    Jan. 5, 2017

(30) Foreign Application Priority Data

Jun. 30, 2015 (EP) .................................... 15001936

(51) Int. Cl.
| | | |
|---|---|---|
| *C08L 63/00* | (2006.01) | |
| *C08J 5/04* | (2006.01) | |
| *C08G 59/40* | (2006.01) | |
| *C08L 61/14* | (2006.01) | |
| *C08G 59/56* | (2006.01) | |

(52) U.S. Cl.
CPC .......... *C08L 63/00* (2013.01); *C08G 59/4014* (2013.01); *C08G 59/4071* (2013.01); *C08G 59/56* (2013.01); *C08J 5/042* (2013.01); *C08L 61/14* (2013.01); *C08J 2361/14* (2013.01); *C08J 2363/00* (2013.01)

(58) Field of Classification Search
None
See application file for complete search history.

(56) References Cited

U.S. PATENT DOCUMENTS

| | | | |
|---|---|---|---|
| 5,494,981 A | 2/1996 | Gorodisher et al. | |
| 2011/0007489 A1* | 1/2011 | Ohigashi | C08G 59/3218 |
| | | | 361/783 |
| 2011/0049426 A1 | 3/2011 | Patel et al. | |
| 2011/0139496 A1 | 6/2011 | Nakamura | |
| 2012/0309923 A1 | 12/2012 | Ogawa et al. | |

FOREIGN PATENT DOCUMENTS

| | | |
|---|---|---|
| CN | 102174242 A | 9/2011 |
| CN | 103265810 A | 8/2013 |
| JP | H08176274 A | 7/1996 |
| JP | 2009013205 A | 1/2009 |
| JP | 2010059363 A | 3/2010 |

OTHER PUBLICATIONS

European Patent Office, Extended European Search Report for European Patent Application No. 15001936.2-1306 dated Oct. 26, 2015.

C.-S. Wang, M.C. Lee: "Synthesis, Characterisation and Properties of Multifunctional Naphthalene Containing Epoxy Resins Cured with Cyanate Ester", Journal of Applied Polymer Science 73 (1999) 1611-1622.

C. H. Lin, "Synthesis of Novel Phosphorus-Containting Cyanate Esteres and Their Curing Reaction with Epoxy Resin", Department of Chemical Engineering, National Chung Hsing University, Taichung, Taiwan, ROC.

C.H. Lin et al, "Synthesis, Characterization, and Properties of the Novel Epoxy Resins and Cyanate Esters", Department of Chemical Engineering, National Chung Hsing University, Taichung, Taiwan, Journal of Polymer Science Part A: Polymer Chemistry.

Tsung-Han Ho et al, "Reactive & Functional Polymers: Thermal, Physical and Flame-Retardant Properties of Phosphorus-Containing Epoxy Cured with Cyanate Ester", Elsevier Ltd, 2008.

* cited by examiner

*Primary Examiner* — Ana Lucrecia Woodward
(74) *Attorney, Agent, or Firm* — Lorenz & Kopf, LLP

(57) ABSTRACT

The embodiments relate to a polymerizable thermoset composition having improved flame retardant properties, a polymerized thermoset having improved flame retardant properties, a process for manufacturing the polymerized thermoset, and use of the polymerizable thermoset composition to produce lightweight construction components, preferably carbon fiber composites (CFRP), and a lightweight construction component, preferably carbon fiber composite (CFRP), containing the polymerized thermoset.

10 Claims, 4 Drawing Sheets

FLAME-RETARDANT, HIGH TEMPERATURE RESISTANT THERMOSETS ON THE BASIS OF NAPHTHALENE-BASED EPOXY RESINS AND CYANATE ESTERS

CROSS-REFERENCE TO RELATED APPLICATION

This application claims priority to European Patent Application No. 15 001 936.2, filed Jun. 30, 2015, which is incorporated herein by reference in its entirety.

TECHNICAL FIELD

The embodiments described herein relate to a polymerisable thermoset composition having improved flame retardant properties, a polymerised thermoset having improved flame retardant properties, a process for manufacturing the polymerised thermoset, and the use of the polymerisable thermoset composition to produce lightweight construction components, preferably carbon fibre composites (CFRP), and a lightweight construction component, preferably carbon fibre composite (CFRP), containing the polymerised thermoset.

BACKGROUND

Today's thermoset material systems used in commercial applications have very limited thermal resistance, and are manufactured on the basis of epoxy resins. However, this limited thermal stability is too low for many applications, particularly for environments in which increased thermal and mechanical loads occur. On the other hand, other commercially available materials for high-temperature applications, such as BMI or polyimide resins, are either toxic or extremely expensive and therefore not suitable for commercial use. Cyanate esters have an extremely high glass transition temperature of up to 400° C. This is due to the high crosslinking density of the thermoset network which however also means that the material is very brittle. Because of its brittleness until now this type of thermoset system has not found any commercial use in aviation. Moreover, most cyanate ester systems require a curing temperature higher than 200° C., which further affects the financial viability of said systems. Additionally, most of the curing agents used are harmful to health.

The materials should also exhibit good flame retardant properties. The flame retardants used should also not be associated with any toxic effects, and should not impair the physical properties of the materials, such as the glass transition temperature and mechanical properties. The flame retardants should also have the lowest possible migration tendency, and small quantities of the flame retardant should be sufficient to achieve the desired flame resistance. Many cyanate ester (CE)/epoxy combinations are already known.

For example, U.S. Pat. No. 5,494,981; US 2012/0309923; JP2009013205 (A); and C.-S. Wang, M. C. Lee: Synthesis, characterisation and properties of multifunctional naphthalene containing epoxy resins cured with cyanate ester, Journal of applied polymer science 73 (1999) 1611-1622, describe CE/epoxy mixtures that are produced with the aid of various curing agents, and catalysts respectively. These make use primarily of nonylphenol/transition metal catalysts as well as Brønstedt acids and amines. Transition metal catalysts are usually not soluble in the resin matrix, so phenols, such as nonylphenol are used as co-catalysts. Not only that there are health concerns surrounding the transition metal catalysts used, nonylphenol has been cited as a "substance of very high concern" (SVHC) since December 2012 by REACH [European Chemical Agency, Support document for identification of 4-Nonylphenol branched and linear, 13 Dec. 2012]. Additionally a significant disadvantage of Brønstedt-acids is that most of them are prepared on an aqueous basis. Since cyanate esters tend to form carbamates in the presence of water, which degrade into $CO_2$ and amines at elevated temperatures, thereby impairing the performance of the materials, these catalysts should not be used.

Moreover, JP 08-176274 (A); JP 2010-059363; C.-S. Wang, M. C. Lee: Synthesis, characterisation and properties of multifunctional naphthalene-containing epoxy resins cured with cyanate ester, Journal of applied polymer science 73 (1999) 1611-1622, for example, describe materials prepared from cyanate esters and naphthalene-based epoxies. The naphthalene-based epoxies used in JP 08-176274 (A) are low-molecular and difunctional, which means that a naphthalene molecule has at most two glycidyl ether functionalities.

Because the naphthalene has such a low functionality, its crosslinking density is also low compared with more highly functionalised epoxies. In turn, low crosslinking density is also associated with lower thermal stability (Tg) and higher water absorption, but also reduced brittleness.

The epoxies used in JP 2010-059363 for preparing CE/epoxy materials are prepolymers based on polyphenylene with a naphthalene-functionality in the polymer backbone. These prepolymers only have one glycidyl ether functionality per repeating unit, which again results in a low crosslinking density. Moreover, unlike a backbone consisting only of naphthalene, the introduction of the polyphenylene ether group has the effect of increasing the molecular mobility of the polymer backbone. This might improve the mechanical properties of the material, but it would also lead to a decrease of the thermal properties (Tg). In Wang et. al., low-molecular, tetrafunctional naphthalene-based epoxies are used in CE/epoxy mixtures.

The advantage of these tetraglycidyl ether naphthalenes is that the resulting thermoset network exhibits enormously high crosslinking density and the associated good thermal as well as hygrothermal properties. In this way, it is possible to avoid lowering the Tg too far by mixing the epoxy into the cyanate ester. The curing process in this publication was carried out using nonylphenol/copper(II)acetyl acetonate, which is to be avoided at all costs for the reasons given above. The flame resistance of these systems can also be improved further.

Flame retardants can be added to polymers generally as simple additives (additive flame protection), or they may be copolymerised into the polymer matrix using specially functionalised monomers. However, if specially functionalised monomers are used, other properties of the resin matrix may be affected negatively. In the case of additive flame protection, the flame retardants used may tend to migrate more readily, since flame retardants used are not bonded to the polymer matrix.

Since cyanate esters already possess a high flame resistance because of their high aromatic content, the known literature contains only few examples in which cyanate esters have been chemically modified with flame retardants.

However, the resin matrix was chemically modified with the flame retardants before the curing process for this purpose. Such concepts are described for example in C. H. Lin, Polymer 2004, 45, 7911-7926; T.-H. Ho, H.-J. Hwang, J.-Y. Shieh, M.-C. Chung, Reactive and Functional Polymers 2009, 69, 176-182 and C. H. Lin, K. Z. Yang, T. S. Leu, C. H. Lin, J. W. Sie, Journal of Polymer Science Part A: Polymer Chemistry 2006, 44, 3487-3502.

Even if the physical and thermal properties of the polymer systems are not compromised thereby, further process steps are still necessary in order to modify the respective components. Furthermore, depending on the requirements profile the polymer must fulfil, it may also be necessary to use starter materials that have been modified differently, which renders their production more complicated and thus also more expensive.

Therefore, it would be desirable to provide a polymerisable thermoset composition that is resistant to high temperatures and has good flame retardant qualities. It should also be curable at moderate temperatures and should not contain any water-based compounds such as Brønstedt acids or curing agents or catalysts that are harmful to health, such as transition metal catalysts, and it should be modifiable in terms of impact resistance. It is further desirable to produce a polymerisable thermoset composition that is suitable for manufacturing lightweight construction components such as carbon fibre composites (CFRP).

Given the above, an embodiment provides a highly flame retardant, polymerisable thermoset composition, which additionally is resistant to high temperatures in the cured state, and particularly has increased thermal resistance, compared to pure epoxy resins. A further characteristic of the present embodiment is that in the cured state of the polymerisable thermoset composition, the flame retardant contained therein exhibits a low tendency to migrate.

Another characteristic of the present embodiment is that the polymerisable thermoset composition should not require a resin matrix that has been modified with flame protection agents before the curing process.

In accordance with certain embodiments, in the cured state the polymerisable thermoset composition has a high glass transition temperature, particularly a glass transition temperature, that is higher than those of the previously known CE/epoxy combinations. Still another characteristic of the present embodiment is that the polymerisable thermoset composition should have high impact resistance in the current state, particularly an impact resistance that is improved compared with pure CE/epoxy combinations. Another characteristic of the present embodiment is that the polymerisable thermoset composition should be curable at moderate temperatures, and in particular should have a lower curing temperature than pure cyanate esters. A further characteristic of the present embodiment is that the polymerisable thermoset composition should exhibit better resistance to hydrolysis than pure cyanate esters. Still another characteristic of the present embodiment is that the polymerisable thermoset composition should not contain any curing agents and/or catalysts that are injurious to health.

These and other features and characteristics are provided by the subject-matter defined in the claims. Advantageous embodiments constitute the subject matter of dependent claims.

SUMMARY

Accordingly, a present embodiment is a polymerisable thermoset composition comprising: a) a di- or polyfunctional organic cyanate ester resin, b) a naphthalene based epoxy resin, and c1) at least one phosphorus-containing phenol and/or c2) at least one phosphorus-containing epoxy and at least one diamine.

In the cured state, the polymerisable thermoset composition according to the embodiment is resistant to high temperatures and has increased thermal resistance and flame resistance particularly compared with pure epoxy resins. A further advantage is that the polymerisable thermoset compound according to the embodiment does not require modifications to be made to components a) and b) to provide flame protection therefor, since the flame protection agent is already contained in the curing agent component. A further advantage is that in the cured state the flame protection agents in the polymerisable thermoset composition according to the embodiment do not have any tendency to migrate, and unlike halogen-containing flame protection agents, decomposition products that are poisonous and harmful to health can be avoided.

A further advantage is that in the cured state the polymerisable thermoset composition according to the invention has a high glass transition temperature, which is in particular higher than previously known CE/epoxy combinations. A further advantage is that in the cured state the polymerisable thermoset composition according to the embodiment is highly impact resistant, and the impact resistance thereof is in particular improved compared with pure CE/epoxy combinations. A further advantage is that polymerisable thermoset composition according to the embodiment can be cured at a moderate temperature, which is in particular lower than for pure cyanate esters. A further advantage is that the polymerisable thermoset composition according to the embodiment has improved resistance to hydrolysis compared with pure cyanate esters. A further advantage is that the polymerisable thermoset composition according to the embodiment contains no curing agents and/or catalysts that are harmful to health.

The di- or polyfunctional organic cyanate ester resin and the naphthalene-based epoxy resin typically contain no phosphorus.

For example, the phosphorus-containing phenol is a (hydrocarbyl-)-phosphonic acid ester and/or contains 9-dihydro-9-oxa-10-phosphaphenanthrene-10-oxide as a structural unit.

For example, the phosphorus-containing phenol contains one of the following structural units (I) and (II) wherein

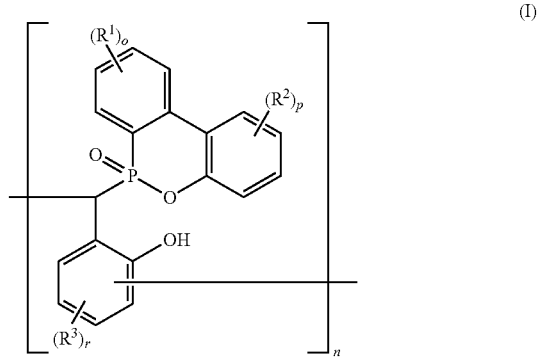

n is a number between 1 and 1000, preferably between 200 and 500,
o is a number between 0 and 4, preferably between 0 and 2, more preferably 0 or 1, and is most preferably 0,
p is a number between 0 and 4, preferably between 0 and 2, more preferably 0 or 1, and is most preferably 0,
r is a number between 0 and 3, preferably between 0 and 2, more preferably 0 or 1, and is most preferably 0, $R^1$ is a $C_1$-$C_{10}$ alkyl,
$R^2$ is a $C_1$-$C_{10}$ alkyl, and
$R^3$ is a $C_1$-$C_{10}$ alkyl
or

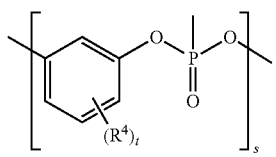

(II)

s is a number between 1 and 1000, preferably between 100 and 600,
t is a number between 0 and 4, preferably between 0 and 2, more preferably 0 or 1 and most preferably is 0, and
$R^4$ is a $C_1$-$C_{10}$ alkyl The following compounds are examples of phosphorus-containing phenols

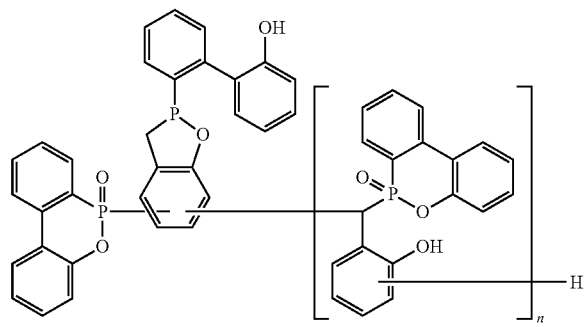

wherein n is a number between 200 and 500 or

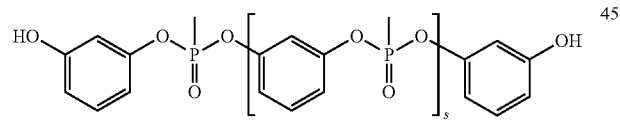

wherein s is a number between 100 and 600.

The formation of triazines based on cyanate esters is catalysed by the free hydroxyl functionalities, which optimises the curing process in terms of duration and the degree of hardening. Moreover, the compounds are not harmful to health, and because of their high phosphorus content they lend good flame resistance to the cured polymer mixture.

For example, the phosphorus-containing epoxy is a (hydrocarbyl-)-phosphonic acid ester and/or contains 9-dihydro-9-oxa-10-phosphaphenanthrene-10-oxide as the structural unit. The phosphorus-containing epoxy preferably contains 9-dihydro-9-oxa-10-phosphaphenanthrene-10-oxide as the structural unit.

For example, the phosphorus-containing epoxy contains the following structural unit (III) wherein:

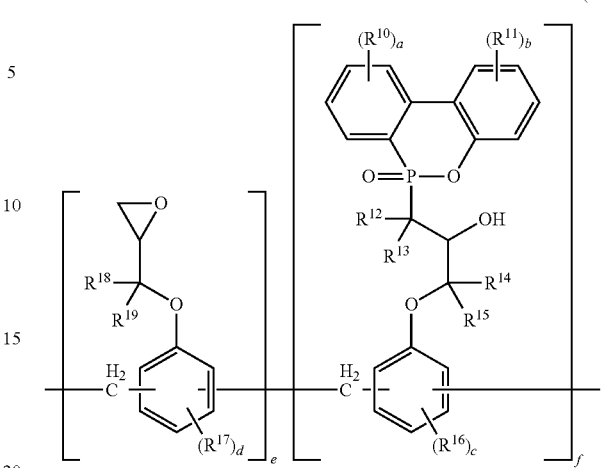

(III)

a is a number between 0 and 4, preferably between 0 and 2, more preferably 0 or 1 and most preferably is 0
b is a number between 0 and 4, preferably between 0 and 2, more preferably 0 or 1 and most preferably is 0,
c is a number between 0 and 3, preferably between 0 and 2, more preferably 0 or 1 and most preferably is 0,
d is a number between 0 and 3, preferably between 0 and 2, more preferably 0 or 1 and most preferably is 0,
e is a number between 1 and 1000, preferably between 200 and 500,
f is a number between 1 and 1000, preferably between 50 and 200,
$R^{10}$ is a $C_1$-$C_{10}$ alkyl,
$R^{11}$ is a $C_1$-$C_{10}$ alkyl,
$R^{12}$ is a $C_1$-$C_{10}$ alkyl or hydrogen, preferably methyl or hydrogen, and most preferably hydrogen,
$R^{13}$ is a $C_1$-$C_{10}$ alkyl or hydrogen, preferably methyl or hydrogen, and most preferably hydrogen,
$R^{14}$ is a $C_1$-$C_{10}$ alkyl or hydrogen, preferably methyl or hydrogen, and most preferably hydrogen,
$R^{15}$ is a $C_1$-$C_{10}$ alkyl or hydrogen, preferably methyl or hydrogen, and most preferably hydrogen,
$R^{16}$ is a $C_1$-$C_{10}$ alkyl,
$R^{17}$ is a $C_1$-$C_{10}$ alkyl,
$R^{18}$ is a $C_1$-$C_{10}$ alkyl or hydrogen, preferably methyl or hydrogen, and most preferably hydrogen, and
$R^{19}$ is a $C_1$-$C_{10}$ alkyl or hydrogen, preferably methyl or hydrogen, and most preferably hydrogen.

The following compound is an example of the phosphorus-containing epoxy:

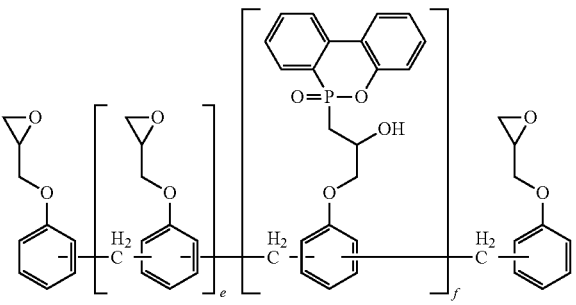

wherein e is a number between 200 and 500, and wherein f is a number between 50 and 200.

Such an epoxy represents an additional epoxy in the resin mixture, and consequently a diamine is also used as a curing agent.

The diamine is typically an aromatic diamine, preferably selected from the group comprising 2,4-diaminotoluene, 2,6-diaminotoluene, 3,5-diethyl-2,4-diaminotoluene, 3,5-diethyl-2,6-diaminotoluene, and primary mono-, di-, tri- or tetra-alkyl substituted 4,4'-diaminodiphenyl methanes, 6-methyl-2,4-bis(methylthio)phenylene-1,3-diamine and 2-methyl-4,6-bis(methylthio)phenylene-1,3-diamine.

Since components c1) and/or c2) function as curing agents, it is not necessary to use curing agents and/or catalysts with harmful health effects.

The polymerisable thermoset composition according to the embodiment therefore preferably does not contain any curing agents and/or catalysts with harmful health effects.

If the polymerisable thermoset composition according to the embodiment should contain diamine, the total quantity of diamine relative to the polymerisable thermoset composition is 0.25 to 5.0% by weight, preferably 0.1 to 2.0% by weight or 0.2 to 1.5% by weight. Alternatively, if the polymerisable thermoset composition contains the aromatic diamine, the content should be in a quantity of for example 0.4 to 1.2% by weight or 0.5 to 1.0% by weight.

In one embodiment, component c2) is present and component c1) is not present.

In a further, preferred embodiment, component c1) is present and component c2) is not present. In this embodiment, a diamine is normally not needed to function as an additional curing agent component. The polymerisable thermoset composition of this embodiment preferably does not contain a diamine.

The compositions according to the embodiment have significantly improved flame retardant properties, and compounds containing component c1) have still better flame retardant properties than the compositions according to the embodiment that contain component c2).

The total quantity of components c1) and c2) relative to the polymerisable thermoset composition is typically in the range from 5.5 to 20% by weight, preferably in the range from 6.0 to 15% by weight, and more preferably in the range from 6.5 to 12% by weight.

The di- or polyfunctional organic cyanate ester resin is for example a cyanate having formula (IV):

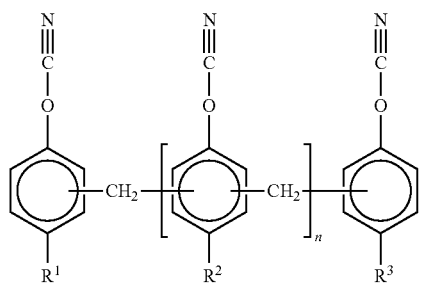

wherein $R^1$, $R^2$ and $R^3$ independently of one another are hydrogen or $C_1$-$C_{10}$ alkyl, and n represents a whole number from 0 to 20.

The di- or polyfunctional organic cyanate ester resin is for example a cyanate having formula (IV):

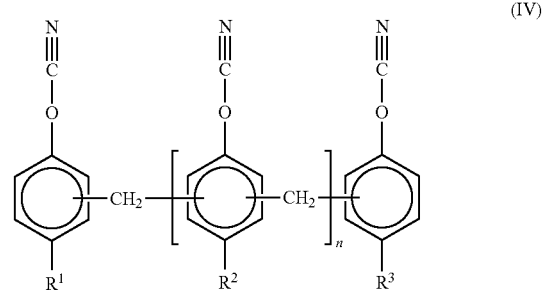

wherein $R^1$, $R^2$ and $R^3$ are hydrogen, and n represents an integer from 0 to 20.

For example, the naphthalene-based epoxy resin represents a polymeric naphthalene-based epoxy resin.

For example, the naphthalene-based epoxy resin is a naphthalene-based epoxy having formula (V):

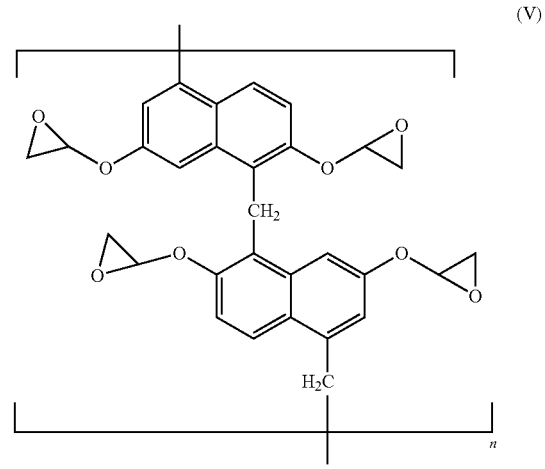

wherein n represents a whole number from 1 to 50.

For example, the polymerisable thermoset composition contains the di- or polyfunctional organic cyanate ester resin and the naphthalene-based epoxy resin in a weight ratio (weight/weight) from 10:1 to 1:1.

For example, the polymerisable thermoset composition comprises at least one high-performance thermoplast, also called an impact modifier, preferably at least one high-performance thermoplast selected from the group comprising polysulfones (PSU), for example polyethersulfone (PES) and polyphenylsulfone (PPSU), polyetherimide (PEI), polysulfone (PSU), polycarbonate (PC), silicone rubber and mixtures thereof.

The impact modifier may also be present in the form of core-shell particles, preferably containing at least one high-performance thermoplast, typically as the core.

The shell of the core-shell particles typically consists of a polymer matrix containing an epoxy resin, for example, and a cyanate ester or mixtures thereof. The core contains, preferably consists of, a different polymer, selected for example from the group comprising silicone rubber, nitrile rubber, styrene-butadiene rubber, polyisoprene rubber, polybutadiene, butyl rubber, fluoroelastomers, etc., and mixtures thereof, made from silicone rubber for example.

The polymerisable thermoset composition contains for example the di- or polyfunctional organic cyanate ester resin and the at least one high-performance thermoplast in a weight ratio (weight/weight) from 100:1 to 6:1 and/or the polymerisable thermoset composition contains the naphthalene-based epoxy resin and the at least one high-performance thermoplast in a weight ratio (weight/weight) from 50:1 to 3:1. In the case of core-shell particles, the weight specification refers to the total mass of the core-shell particle.

The present embodiment further provides a polymerised thermoset that represents a product of reaction of the polymerisable thermoset composition, as described in this document.

The polymerised thermoset has a glass transition temperature from 280° C. to 300° C., for example.

The present embodiment further provides a process for manufacturing the polymerised thermoset, which process comprises the steps of:

Preparing a polymerisable thermoset composition as described herein, and

Polymerising the polymerisable thermoset composition at temperatures in a range from 100 to 180° C.

The present embodiment further relates to the use of the polymerisable thermoset composition as described herein to manufacture lightweight construction components, preferably carbon fibre composites (CFRP).

The present embodiment also relates to a lightweight construction component, preferably carbon fibre composite (CFRP), containing the polymerised thermoset as described herein.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
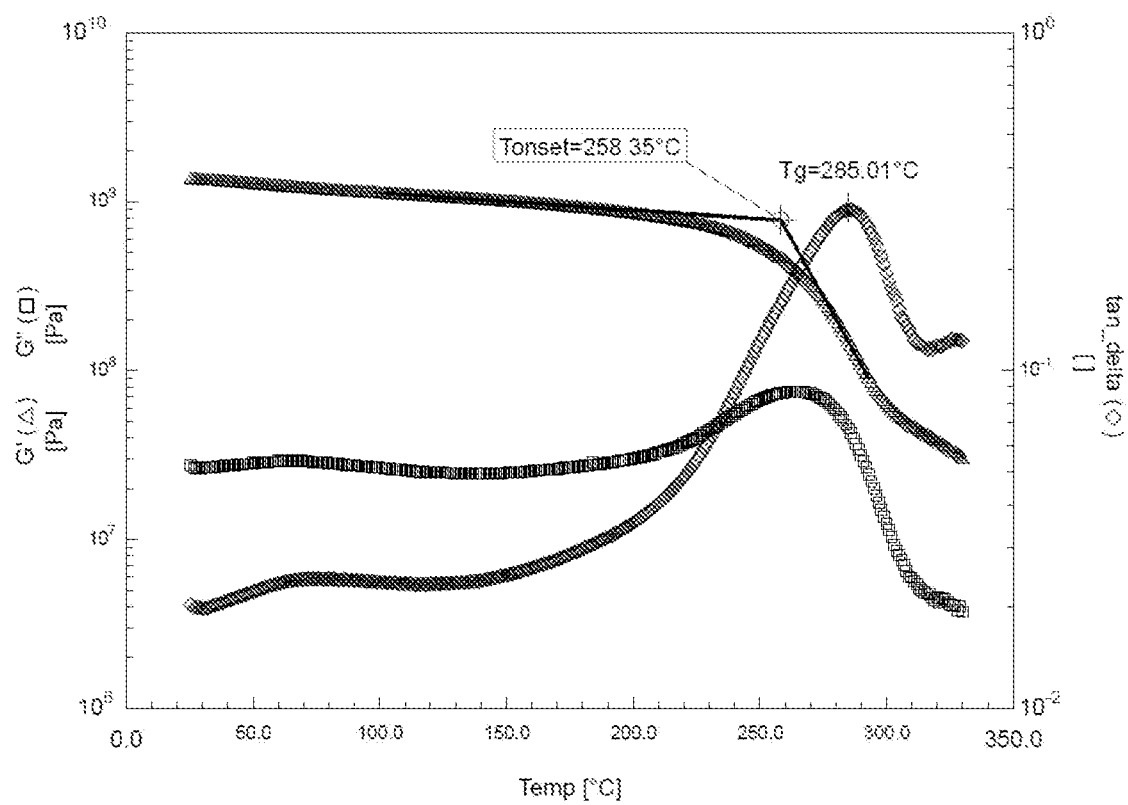
FIG. 1 shows a DMA spectrum of the composition PT15/HP4710/HFC-X=(1/0.5)/0.07, which further contains 9.1% by weight Albidur® EP 2240A.
Figure 2:
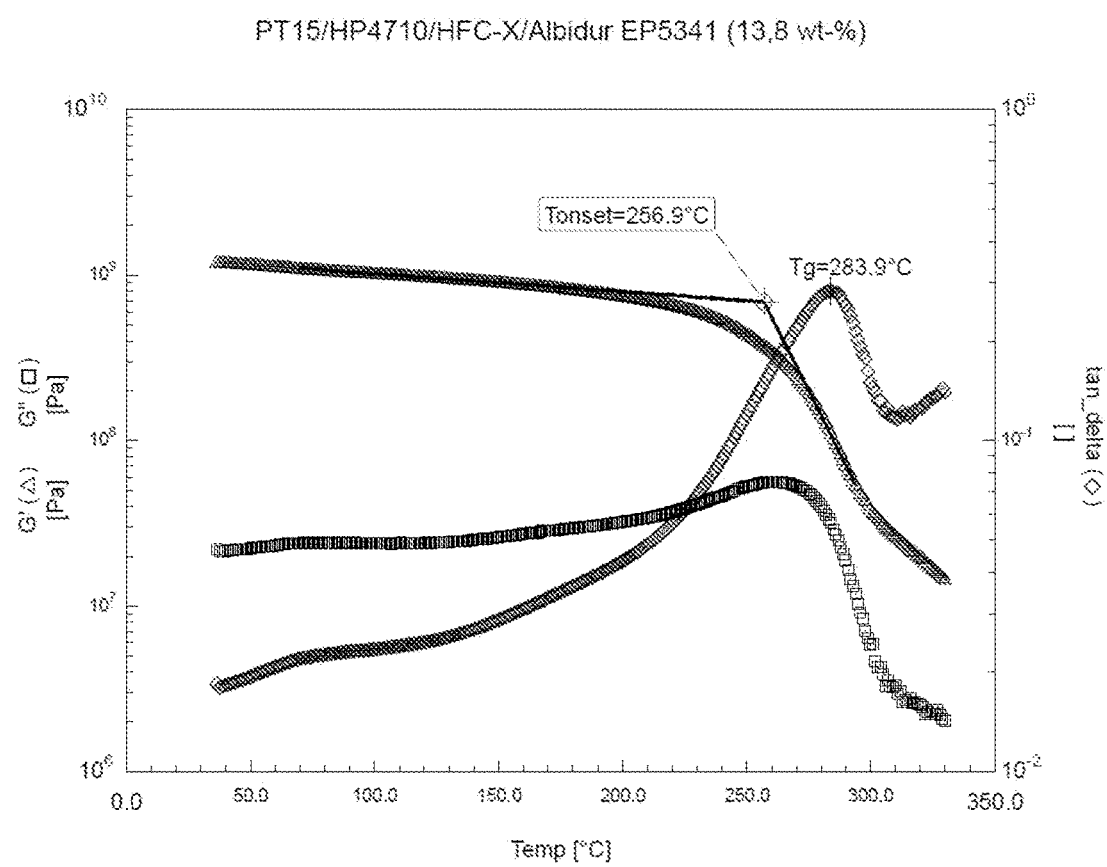
FIG. 2 shows a DMA spectrum of the composition PT15/HP4710/HFC-X=(1/0.5)/0.07, which further contains 13.8% by weight Albidur® EP 5341.
Figure 3:
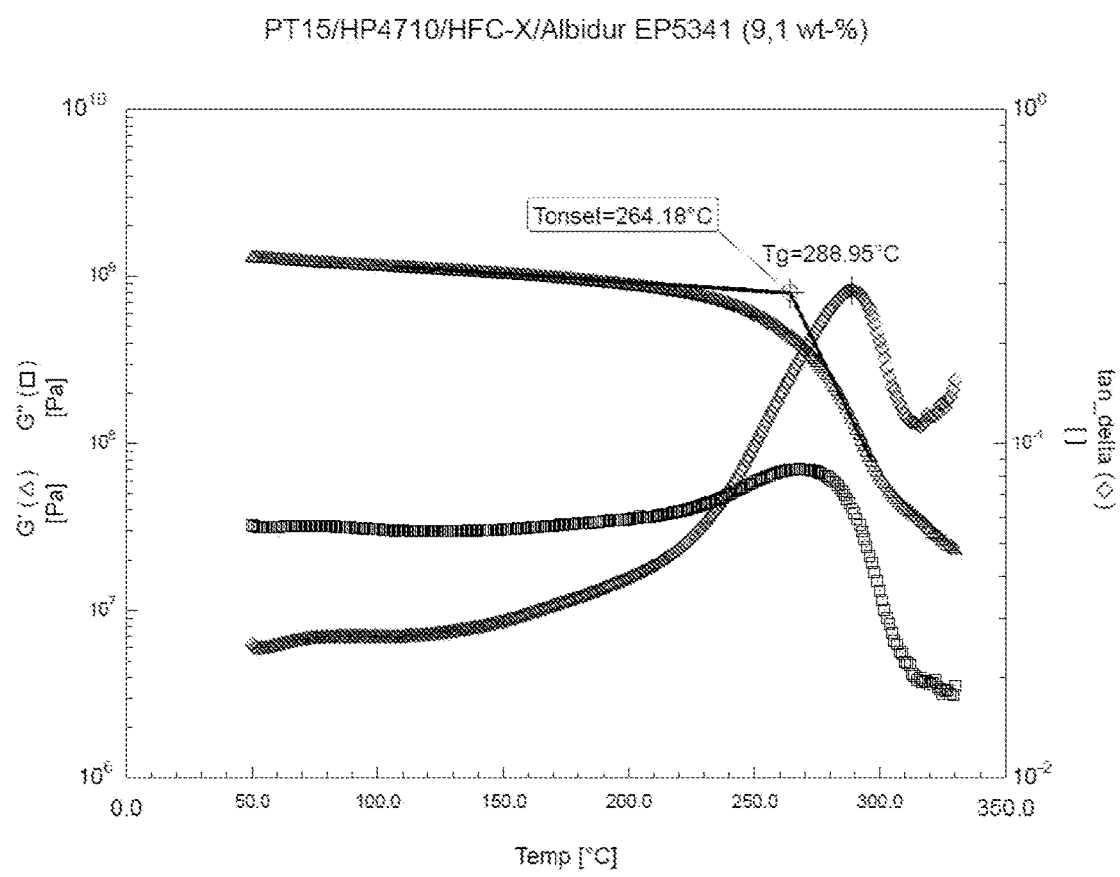
FIG. 3 shows a DMA spectrum of the composition PT15/HP4710/HFC-X=(1/0.5)/0.07, which further contains 9.1% by weight Albidur® EP 5341.
Figure 4:
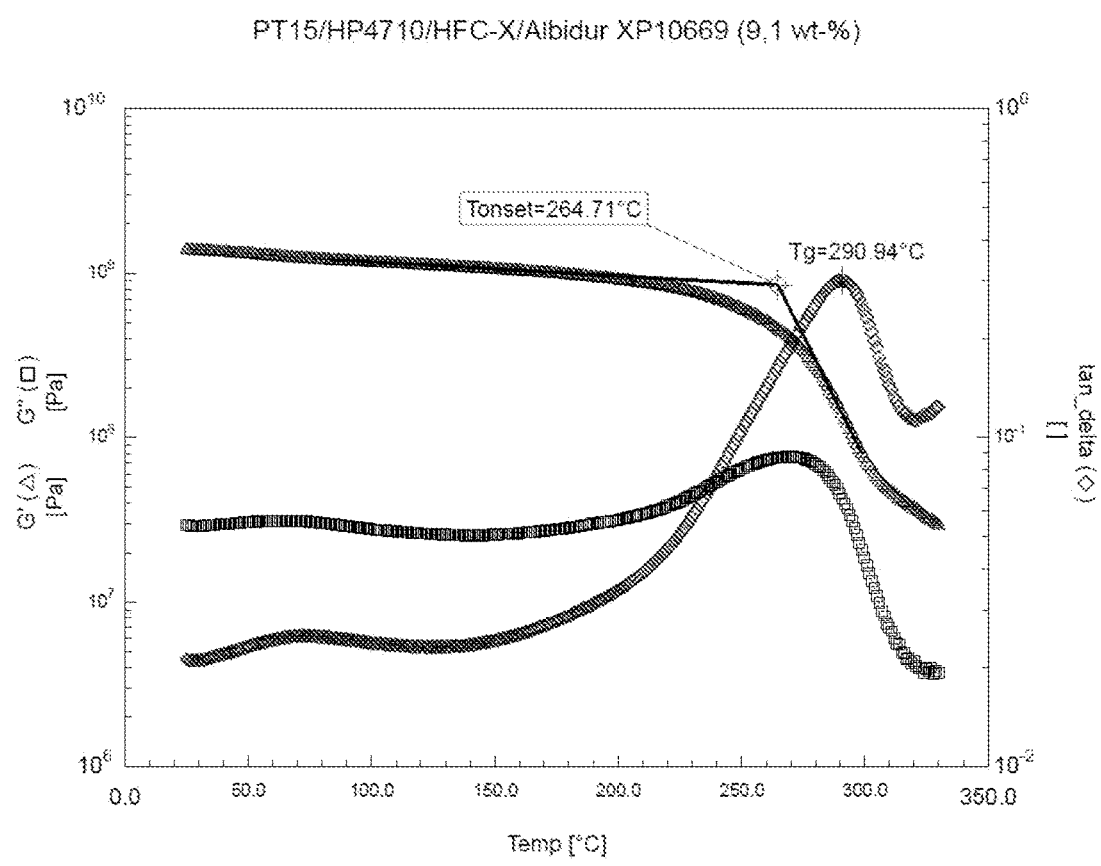
FIG. 4 shows a DMA spectrum of the composition PT15/HP4710/HFC-X=(1/0.5)/0.07, which further contains 9.1% by weight Albidur® XP10669.

The following detailed description is merely exemplary in nature and is not intended to limit the disclosed embodiments or the application and uses thereof. Furthermore, there is no intention to be bound by any theory presented in the preceding background detailed description.

The embodiments disclosed herein relate to a polymerisable thermoset composition comprising: a) a di- or polyfunctional organic cyanate ester resin, b) a naphthalene based epoxy resin, and c1) at least one phosphorus-containing phenol and/or c2) at least one phosphorus-containing epoxy and at least one diamine.

The term "polymerisable" means that under suitable conditions, such as elevated temperature or with the aid of catalysts, the individual components of the composition can be polymerised.

The term "thermoset" refers to a prepolymer that can no longer be reshaped after it has been polymerised and cured.

A requirement of the embodiment is that the polymerisable thermoset composition contains c1) at least one phosphorus-containing phenol and/or c2) at least one phosphorus-containing epoxy and at least one diamine.

The phosphorus-containing phenol is preferably a (hydrocarbyl-)-phosphonic acid ester and/or contains 9-dihydro-9-oxa-10-phosphaphenanthrene-10-oxide as a structural unit.

More preferably, the phosphorus-containing phenol contains one of the following structural units (I) and (II) wherein

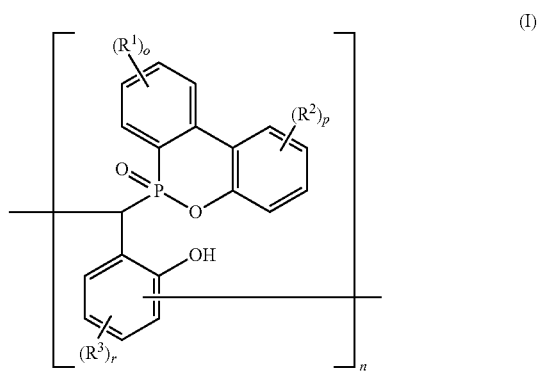

(I)

n is a number between 1 and 1000, preferably between 200 and 500,
o is a number between 0 and 4, preferably between 0 and 2, more preferably 0 or 1, and is most preferably 0,
p is a number between 0 and 4, preferably between 0 and 2, more preferably 0 or 1, and is most preferably 0,
r is a number between 0 and 3, preferably between 0 and 2, more preferably 0 or 1, and is most preferably 0,
$R^1$ is a $C_1$-$C_{10}$ alkyl,
$R^2$ is a $C_1$-$C_{10}$ alkyl, and
$R^3$ is a $C_1$-$C_{10}$ alkyl
or wherein

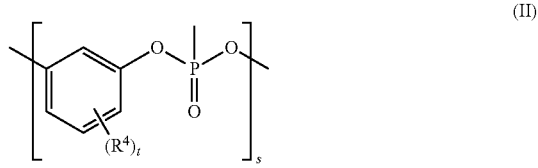

(II)

s is a number between 1 and 1000, preferably between 100 and 600,
t is a number between 0 and 4, preferably between 0 and 2, more preferably 0 or 1 and most preferably is 0, and
$R^4$ is a $C_1$-$C_{10}$ alkyl.

In one embodiment, the polymerisable thermoset composition contains a compound containing structural unit (I), wherein n is a number between 1 and 1000, o, p and r are each independently a number between 0 and 4, and $R^1$, $R^2$ and $R^3$ are each independently a $C_1$-$C_{10}$ alkyl.

The polymerisable thermoset composition may for example contain a compound containing structural unit (I), wherein n is a number between 200 and 500, o, p and r are each independently a number between 0 and 4, and $R^1$, $R^2$ and $R^3$ are each independently a $C_1$-$C_{10}$ alkyl.

For the purposes of the present embodiment, the term "alkyl" refers to a radical from a saturated aliphatic group, including linear alkyl groups and branched alkyl groups, wherein the linear alkyl groups and branched alkyl groups are preferably not substituted.

The bond on the salicylate group of the structural unit according to formula (I) with the next monomer unit is preferably in the ortho position to the OH group.

The polymerisable thermoset composition preferably contains a compound containing structural unit (I) wherein n is a number between 1 and 1000, o, p and r are each independently a number between 0 and 4, and $R^1$, $R^2$ and $R^3$ are each independently a $C_1$-$C_{10}$ alkyl, and the bond on the salicylate group of the structural unit according to formula (I) with the next monomer unit is in the ortho position to the OH group.

For example, the polymerisable thermoset composition contains a compound containing structural unit (I) wherein n is a number between 200 and 500, o, p and r are each independently a number between 0 and 4, and $R^1$, $R^2$ and $R^3$ are each independently a $C_1$-$C_{10}$ alkyl, and the bond on the salicylate group of the structural unit according to formula (I) with the next monomer unit is in the ortho position to the OH group.

In one embodiment, the polymerisable thermoset composition contains a compound containing structural unit (I) wherein n is a number between 1 and 1000, o, p and r are each 0 or 1, and $R^1$, $R^2$ and $R^3$ are each independently a $C_1$-$C_{10}$ alkyl. For example, the polymerisable thermoset composition contains a compound containing structural unit (I) wherein n is a number between 1 and 1000, o, p and r are each 0 or 1, and $R^1$, $R^2$ and $R^3$ are each independently a $C_1$-$C_{10}$ alkyl, and the bond on the salicylate group of the structural unit according to formula (I) with the next monomer unit is in the ortho position to the OH group.

In one embodiment, the polymerisable thermoset composition contains a compound containing structural unit (I) wherein n is a number between 200 and 500, o, p and r are each 0 or 1, and $R^1$, $R^2$ and $R^3$ are each independently a $C_1$-$C_{10}$ alkyl. For example, the polymerisable thermoset composition contains a compound containing structural unit (I) wherein n is a number between 200 and 500, o, p and r are each 0 or 1, and $R^1$, $R^2$ and $R^3$ are each independently a $C_1$-$C_{10}$ alkyl, and the bond on the salicylate group of the structural unit according to formula (I) with the next monomer unit is in the ortho position to the OH group.

For example, the polymerisable thermoset composition contains a compound containing structural unit (I) wherein n is a number between 1 and 1000 and o, p and r are each 0. For example, the polymerisable thermoset composition contains a compound containing structural unit (I) wherein n is a number between 1 and 1000 and o, p and r are each 0, and the bond on the salicylate group of the structural unit according to formula (I) with the next monomer unit is in the ortho position to the OH group.

For example, the polymerisable thermoset composition contains a compound containing structural unit (I) wherein n is a number between 200 and 500 and o, p and r are each 0. For example, the polymerisable thermoset composition contains a compound containing structural unit (I) wherein n is a number between 200 and 500 and o, p and r are each 0, and the bond on the salicylate group of the structural unit according to formula (I) with the next monomer unit is in the ortho position to the OH group.

For example, the polymerisable thermoset composition contains a compound containing structural unit (II), wherein s is a number between 1 and 1000, t is a number between 0 and 4 and $R^4$ is a $C_1$-$C_{10}$ alkyl.

For example, the polymerisable thermoset composition contains a compound containing structural unit (II), wherein s is a number between 100 and 600, t is a number between 0 and 4 and $R^4$ is a $C_1$-$C_{10}$ alkyl.

The polymerisable thermoset composition may for example contain a compound containing structural unit (II), wherein s is a number between 1 and 1000, t is a number between 0 and 2 and $R^4$ is a $C_1$-$C_{10}$ alkyl.

The polymerisable thermoset composition may for example contain a compound containing structural unit (II), wherein s is a number between 100 and 600, t is a number between 0 and 2 and $R^4$ is a $C_1$-$C_{10}$ alkyl.

The polymerisable thermoset composition may for example contain a compound containing structural unit (II), wherein s is a number between 1 and 1000, t is a number between 0 and 1 and $R^4$ is a $C_1$-$C_{10}$ alkyl.

The polymerisable thermoset composition may for example contain a compound containing structural unit (II), wherein s is a number between 100 and 600, t is a number between 0 and 1 and $R^4$ is a $C_1$-$C_{10}$ alkyl.

The polymerisable thermoset composition may for example contain a compound containing structural unit (II), wherein s is a number between 1 and 1000 and t=zero.

The polymerisable thermoset composition may for example contain a compound containing structural unit (II), wherein s is a number between 100 and 600 and t=zero.

The following compounds are examples of the phosphorus-containing phenol

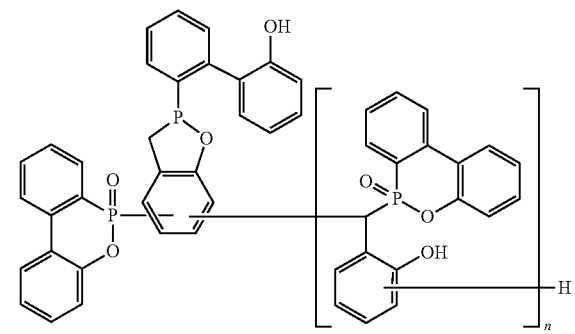

wherein n is a number between 1 and 1000, preferably between 200 and 500 or

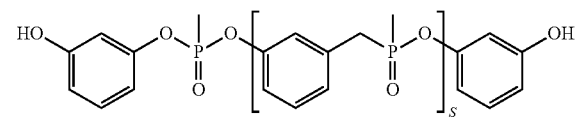

wherein s is a number between 1 and 1000, preferably between 100 and 600.

For example, the phosphorus-containing epoxy is a (hydrocarbyl-)-phosphonic acid ester and/or contains 9-dihydro-9-oxa-10-phosphaphenanthrene-10-oxide as a structural unit. The phosphorus-containing epoxy preferably contains 9-dihydro-9-oxa-10-phosphaphenanthrene-10-oxide as the structural unit.

The phosphorus-containing epoxy preferably contains the following structural unit (III) wherein:

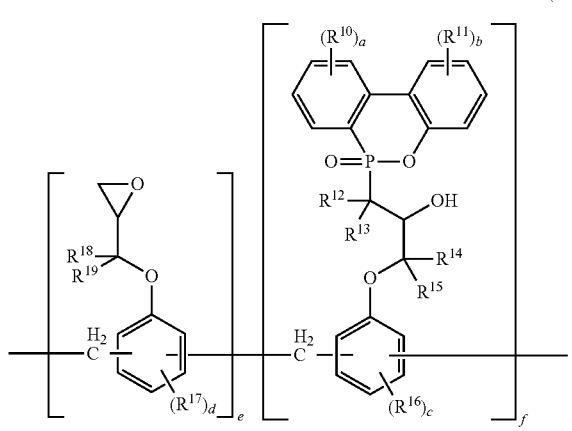

(III)

a is a number between 0 and 4, preferably between 0 and 2, more preferably 0 or 1 and most preferably is 0
b is a number between 0 and 4, preferably between 0 and 2, more preferably 0 or 1 and most preferably is 0,
c is a number between 0 and 3, preferably between 0 and 2, more preferably 0 or 1 and most preferably is 0,
d is a number between 0 and 3, preferably between 0 and 2, more preferably 0 or 1 and most preferably is 0,
e is a number between 1 and 1000, preferably between 200 and 500,
f is a number between 1 and 1000, preferably between 50 and 200,
$R^{10}$ is a $C_1$-$C_{10}$ alkyl,
$R^{11}$ is a $C_1$-$C_{10}$ alkyl,
$R^{12}$ is a $C_1$-$C_{10}$ alkyl or hydrogen, preferably methyl or hydrogen, and most preferably hydrogen,
$R^{13}$ is a $C_1$-$C_{10}$ alkyl or hydrogen, preferably methyl or hydrogen, and most preferably hydrogen,
$R^{14}$ is a $C_1$-$C_{10}$ alkyl or hydrogen, preferably methyl or hydrogen, and most preferably hydrogen,
$R^{15}$ is a $C_1$-$C_{10}$ alkyl or hydrogen, preferably methyl or hydrogen, and most preferably hydrogen,
$R^{16}$ is a $C_1$-$C_{10}$ alkyl,
$R^{17}$ is a $C_1$-$C_{10}$ alkyl,
$R^{18}$ is a $C_1$-$C_{10}$ alkyl or hydrogen, preferably methyl or hydrogen, and most preferably hydrogen, and
$R^{19}$ is a $C_1$-$C_{10}$ alkyl or hydrogen, preferably methyl or hydrogen, and most preferably hydrogen.

The methylene groups in structural unit (III) are preferably each located at the ortho position to the oxygen atom.
In one embodiment, in structural unit (III)
a is either 0 or 1, preferably 0,
b is either 0 or 1, preferably 0,
c is either 0 or 1, preferably 0,
d is either 0 or 1, preferably 0,
e is a number between 1 and 1000, preferably between 200 and 500,
f is a number between 1 and 1000, preferably between 50 and 200,
$R^{10}$ is a $C_1$-$C_{10}$ alkyl,
$R^{11}$ is a $C_1$-$C_{10}$ alkyl,
$R^{12}$ is methyl or hydrogen, preferably hydrogen,
$R^{13}$ is methyl or hydrogen, preferably hydrogen,
$R^{14}$ is methyl or hydrogen, preferably hydrogen,
$R^{15}$ is methyl or hydrogen, preferably hydrogen,
$R^{16}$ is a $C_1$-$C_{10}$ alkyl,
$R^{17}$ is a $C_1$-$C_{10}$ alkyl,
$R^{18}$ is methyl or hydrogen, preferably hydrogen,
$R^{19}$ is methyl or hydrogen, preferably hydrogen.
For example, in structural unit (III)
a is either 0 or 1, preferably 0,
b is either 0 or 1, preferably 0,
c is either 0 or 1, preferably 0,
d is either 0 or 1, preferably 0,
e is a number between 1 and 1000, preferably between 200 and 500,
f is a number between 1 and 1000, preferably between 50 and 200,
$R^{10}$ is a $C_1$-$C_{10}$ alkyl,
$R^{11}$ is a $C_1$-$C_{10}$ alkyl,
$R^{12}$ is methyl or hydrogen, preferably hydrogen,
$R^{13}$ is methyl or hydrogen, preferably hydrogen,
$R^{14}$ is methyl or hydrogen, preferably hydrogen,
$R^{15}$ is methyl or hydrogen, preferably hydrogen,
$R^{16}$ is a $C_1$-$C_{10}$ alkyl,
$R^{17}$ is a $C_1$-$C_{10}$ alkyl,
$R^{18}$ is methyl or hydrogen, preferably hydrogen,
$R^{19}$ is methyl or hydrogen, preferably hydrogen The methylene groups in structural unit (III) are each located at the ortho position to the oxygen atom.
For example, in structural unit (III) a, b, c and e are each 0, e is a number between 1 and 1000, f is a number between 1 and 1000 and $R^{12}$, $R^{13}$, $R^{14}$, $R^{15}$, $R^{18}$ and $R^{19}$ are each hydrogen. For example in structural unit (III), a, b, c and e are each 0, e is a number between 1 and 1000, f is a number between 1 and 1000, and $R^{12}$, $R^{13}$, $R^{14}$, $R^{15}$, $R^{18}$ and $R^{19}$ are each hydrogen, and the methylene groups are each located on the ortho position to the oxygen atom.

For example, in structural unit (III) a, b, c and e are each 0, e is a number between 200 and 500, f is a number between 50 and 200 and $R^{12}$, $R^{13}$, $R^{14}$, $R^{15}$, $R^{18}$ and $R^{19}$ are each hydrogen. For example, in structural unit (III) a, b, c and e are each 0, e is a number between 200 and 500, f is a number between 50 and 200 and $R^{12}$, $R^{13}$, $R^{14}$, $R^{15}$, $R^{18}$ and $R^{19}$ are each hydrogen, and the methylene groups are each located on the ortho position to the oxygen atom.

The following compound is an example of the phosphorus-containing epoxy:

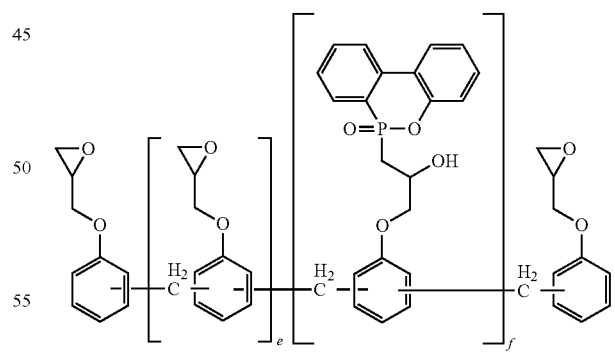

wherein e is a number between 1 and 1000, preferably between 50 and 200, and
wherein f is a number between 1 and 1000, preferably between 50 and 200,
and the methylene groups are each located on the ortho position to the oxygen atom.
Such an epoxy represents an additional epoxy in the resin mixture, and for this reason a diamine is also used as a curing agent.

The diamine is typically an aromatic diamine, preferably selected from the group comprising 2,4-diaminotoluene, 2,6-diaminotoluene, 3,5-diethyl-2,4-diaminotoluene, 3,5-diethyl-2,6-diaminotoluene, and primary mono-, di-, tri- or tetra-alkyl substituted 4,4'-diaminodiphenyl methanes, 6-methyl-2,4-bis(methylthio)phenylene-1,3-diamine and 2-methyl-4,6-bis(methylthio)phenylene-1,3-diamine.

If the polymerisable thermoset composition according to the embodiment should contain diamine, the total quantity of diamine relative to the polymerisable thermoset composition is 0.25 to 5.0% by weight, preferably 0.1 to 2.0% by weight or 0.2 to 1.5% by weight. Alternatively, the polymerisable thermoset composition contains the aromatic diamine, preferably in a quantity of for example 0.4 to 1.2% by weight or 0.5 to 1.0% by weight.

In one embodiment, component c2) is present and component c1) is not present.

In a further, preferred embodiment, component c1) is present and component c2) is not present. In this embodiment, a diamine is normally not needed to function as an additional curing component. The polymerisable thermoset composition of this embodiment preferably does not contain a diamine.

The total quantity of components c1) and c2) relative to the polymerisable thermoset composition is typically in the range from 5.5 to 20% by weight, preferably in the range from 6.0 to 15% by weight, and more preferably in the range from 6.5 to 12% by weight.

Since components c1) and/or c2) function as curing agents, curing agents and/or catalysts with harmful health effects do not need to be used.

The polymerisable thermoset composition according to the embodiment preferably does not contain any curing agents and/or catalysts with harmful health effects.

A further requirement of the present embodiment is that the polymerisable thermoset composition comprises a di- or polyfunctional organic cyanate ester resin.

The choice of di- or polyfunctional organic cyanate ester resin is not critical. In theory, any at least difunctional cyanate ester resin can be used. However, it is preferable if di- or polyfunctional organic cyanate ester resins having formula (IV) are used:

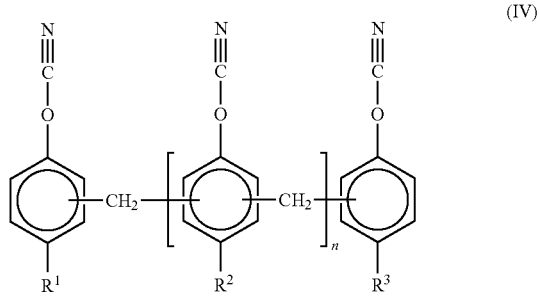

(IV)

wherein $R^1$, $R^2$ and $R^3$ are each independently hydrogen or $C_1$-$C_{10}$ alkyl, and n represents an integer from 0 to 20.

In one embodiment of the present embodiment, the di- or polyfunctional organic cyanate ester resin is a cyanate having formula (IV), wherein $R^1$, $R^2$ and $R^3$ are independently hydrogen or $C_1$-$C_{10}$ alkyl and n represents an integer from 0 to 10. The di- or polyfunctional organic cyanate ester resin is preferably a cyanate having formula (IV), wherein $R^1$, $R^2$ and $R^3$ are independently hydrogen or $C_1$-$C_{10}$ alkyl, and n represents an integer from 1 to 5.

The methylene group in formula (IV) may be at the ortho position to the cyanate group in each case. The methylene group in formula (IV) is preferably located in the ortho position to the cyanate group in each case.

For example, the di- or polyfunctional organic cyanate ester resin is a cyanate having formula (IV), wherein $R^1$, $R^2$ and $R^3$ are hydrogen or $C_1$-$C_{10}$ alkyl, and n represents an integer from 0 to 20. Alternatively, the di- or polyfunctional organic cyanate ester resin is a cyanate having formula (IV), wherein $R^1$, $R^2$ and $R^3$ are hydrogen or $C_1$-$C_{10}$ alkyl, and n represents an integer from 0 to 10. The di- or polyfunctional organic cyanate ester resin is preferably a cyanate having formula (IV), wherein $R^1$, $R^2$ and $R^3$ are hydrogen or $C_1$-$C_{10}$ alkyl, and n represents an integer from 1 to 5. The di- or polyfunctional organic cyanate ester resin is for example a cyanate having formula (IV), wherein $R^1$, $R^2$ and $R^3$ are hydrogen or $C_1$-$C_{10}$ alkyl, and n represents an integer from 1 to 5, and the methylene group is in the ortho position to the cyanate group in each case.

In one embodiment of the present embodiment, the di- or polyfunctional organic cyanate ester resin is a cyanate having formula (IV);

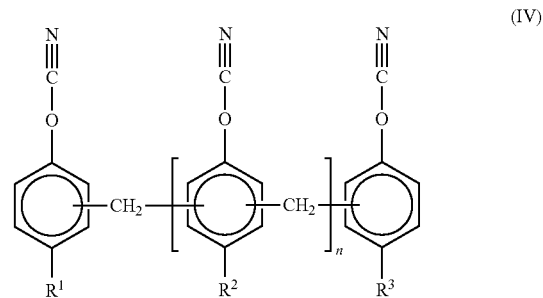

(IV)

wherein $R^1$, $R^2$ and $R^3$ are hydrogen and n represents an integer from 0 to 20.

For example, the di- or polyfunctional organic cyanate ester resin is a cyanate having formula (IV), wherein $R^1$, $R^2$ and $R^3$ are hydrogen and n represents an integer from 1 to 10. The di- or polyfunctional organic cyanate ester resin is preferably a cyanate having formula (IV), wherein $R^1$, $R^2$ and $R^3$ are hydrogen and n represents an integer from 1 to 5.

In one embodiment of the present embodiment, the di- or polyfunctional organic cyanate ester resin is a cyanate having formula (IV), wherein $R^1$, $R^2$ and $R^3$ are hydrogen and n represents 1, 2 or 3. For example, the di- or polyfunctional organic cyanate ester resin is a cyanate having formula (IV), wherein $R^1$, $R^2$ and $R^3$ are hydrogen and n represents 1, 2 or 3, and the methylene is located in the ortho position to the cyanate group in each case.

The cited di- or polyfunctional organic cyanate ester resins having formula (I) may also be used as monomers or as prepolymers, alone or in mixtures with each other.

The polymerisable thermoset composition preferably comprises the di- or polyfunctional organic cyanate ester resin in a quantity from for example 50 to 80% by weight, or 55 to 75% by weight, relative to the total weight of the composition. Alternatively, the polymerisable thermoset composition comprises the di- or polyfunctional organic cyanate ester resin preferably in a quantity from for example 55 to 70% by weight, or 60 to 65% by weight relative to the total weight of the composition.

A further requirement of the present embodiment is that the polymerisable thermoset composition comprises a naphthalene-based epoxy resin.

In theory, any naphthalene-based epoxy resin can be used. Preferably, however, naphthalene-based epoxy resins that have four glycidyl ether functionalities per repeating unit are used. This high number of glycidyl ether functionalities is particularly favourable for obtaining a thermoset with high crosslinking density.

In one embodiment of the present embodiment, the naphthalene-based epoxy resin is a polymeric naphthalene-based epoxy resin.

For example, the naphthalene-based epoxy resin is a naphthalene-based epoxy resin having formula (V):

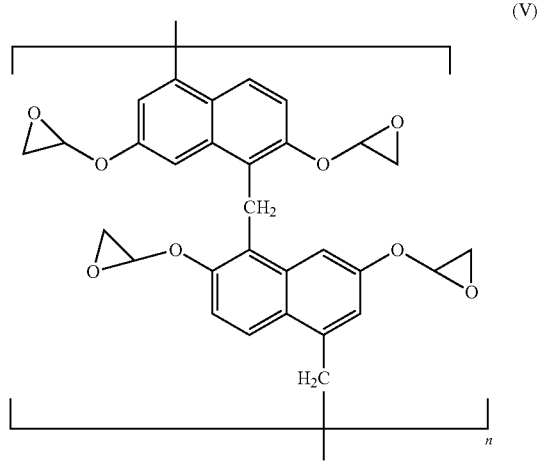

(V)

wherein n represents an integer from 1 to 50.

The naphthalene-based epoxy resin is preferably a naphthalene-based epoxy resin having formula (V), wherein n represents an integer from 1 to 40 or 1 to 20. Alternatively, the naphthalene-based epoxy resin is a naphthalene-based epoxy resin having formula (V), wherein n represents an integer from 1 to 10 or 1 to 5.

The cited naphthalene-based epoxy resins having formula (V) may also be used as monomers or as prepolymers, alone or in mixtures with each other.

The polymerisable thermoset composition comprises the naphthalene-based epoxy resin preferably in a quantity of for example 19.9 to 48% by weight, or 24.8 to 43.5% by weight relative to the total weight of the composition. Alternatively, the polymerisable thermoset composition comprises the naphthalene-based epoxy resin preferably in a quantity of for example 29.6 to 43.8% by weight or 29.6 to 35% by weight, relative to the total weight of the composition.

To obtain a polymerised thermoset with high thermal stability, it is advantageous if the polymerisable thermoset composition contains the di- or polyfunctional organic cyanate ester resin and the naphthalene-based epoxy resin in a certain weight ratio.

Therefore, the polymerisable thermoset composition preferably contains the di- or polyfunctional organic cyanate ester resin and the naphthalene-based epoxy resin in a weight ratio (weight/weight) from 10:1 to 1:1. For example, the polymerisable thermoset composition contains the di- or polyfunctional organic cyanate ester resin and the naphthalene-based epoxy resin in a weight ratio (weight/weight) from 7:1 to 1:1 or from 5:1 to 1:1. In one embodiment of the present embodiment, the polymerisable thermoset composition contains the di- or polyfunctional organic cyanate ester resin and the naphthalene-based epoxy resin in a weight ratio (weight/weight) of about 2:1.

In one embodiment of the present embodiment, the naphthalene-based epoxy resin has an EEW from 100 to 500 g/eq, preferably from 125 to 300 g/eq and most particularly preferably from 150 to 200 g/eq.

In order to obtain a polymerised thermoset with high impact resistance, it is advantageous if the polymerisable thermoset composition comprises at least one high-performance thermoplast, also called an impact modifier.

For the purposes of the present embodiment, a "high-performance thermoplast" is a thermoplast with which the impact resistance of the polymerised thermosets may be modified, preferably increased.

In one embodiment of the present embodiment, the polymerisable thermoset composition therefore comprises a) a di- or polyfunctional organic cyanate ester resin, b) a naphthalene based epoxy resin, and c1) at least one phosphorus-containing phenol, and/or c2)

at least one phosphorus-containing epoxy and at least one diamine, and additionally, d) at least one high-performance thermoplast.

For example, the polymerisable thermoset composition comprises at least one high-performance thermoplast, also called an impact modifier, selected from the group comprising polysulfones (PSU), for example polyethersulfone (PES) and polyphenylsulfone (PPSU), polyetherimide (PEI), polysulfone (PSU), polycarbonate (PC), silicone rubber and mixtures thereof.

The impact modifier may also be present in the form of core-shell particles, in the present case preferably containing at least one high-performance thermoplast, as described above, typically as the core.

The polymerisable thermoset composition comprises for example silicone rubber as the high-performance thermoplast, preferably in the form of core-shell particles.

The shell of the core-shell particles typically consists of a polymer matrix containing an epoxy resin, a cyanate ester or mixtures thereof. The core contains, preferably consists of, a different polymer, selected for example from the group comprising silicone rubber, nitrile rubber, styrene-butadiene rubber, polyisoprene rubber, polybutadiene, butyl rubber, fluoroelastomers, etc., and mixtures thereof, for example silicone rubber.

For example, the core contains, preferably consists of, silicone rubber, and the shell contains, preferably consists of, an epoxy resin. Alternatively, the core contains, preferably consists of, silicone rubber, and the shell contains, preferably consists of, a cyanate ester.

In the case of an epoxy resin, the EEW (epoxy equivalent weight) thereof is typically between 200 and 350 g/eq.

The weight ratio between the core and shell of the core-shell particles may be for example 25:75 to 75:25, preferably 30:70 to 60:40, more preferably 35:65 to 50:50.

Examples of suitable core-shell particles are Albidur® EP 5341, Albidur® EP 2240A and Albidur® XP 10669. More details about the properties and use of these additives are provided in "Fibre-reinforced composites based on epoxy resins modified with elastomers and surface-modified silica nanoparticles", Journal of Material Science 2013 (Stephan Sprenger).

The polymerisable thermoset composition comprises the at least one high-performance thermoplast preferably in a quantity from for example 0.1 to 20% by weight, or 0.5 to 15% by weight relative to the total weight of the composition. Alternatively, polymerisable thermoset composition comprises the at least one high-performance thermoplast preferably in a quantity from for example 1.0 to 18% by weight or 2.0 to 14% by weight relative to the total weight of the composition.

In the case of core-shell particles, the weight specification refers to the total mass of the core-shell particle.

In order to obtain a polymerised thermoset with high impact resistance, it is advantageous if the polymerisable thermoset composition contains the mixture of di- or polyfunctional organic cyanate ester resin and naphthalene-based epoxy resin and the at least one high-performance thermoplast in a certain weight ratio.

For example, the polymerisable thermoset composition contains the mixture of di- or polyfunctional organic cyanate ester resin and naphthalene-based epoxy resin and the at least one high-performance thermoplast in a weight ratio (weight/weight) from 100:1 to 3:1. In one embodiment of the present embodiment, the polymerisable thermoset composition contains the mixture of di- or polyfunctional organic cyanate ester resin and naphthalene-based epoxy resin and the at least one high-performance thermoplast in a weight ratio (weight/weight) from 50:1 to 3:1 or from 40:1 to 5:1. The polymerisable thermoset composition preferably contains the mixture of di- or polyfunctional organic cyanate ester resin and naphthalene-based epoxy resin and the at least one high-performance thermoplast in a weight ratio (weight/weight) from 33:1 to 10:1.

Still more auxiliary agents and additives may be added to the polymerisable thermoset composition. For example, lubricants such as fatty acid esters, metal soaps thereof, fatty acid amides and silicone compounds, antiblocking agents, inhibitors, stabilisers against hydrolysis, light, heat and discolouration, flame protection agents, dyes, pigments, inorganic or organic filler materials to enhance mechanical and/or dielectric properties and reinforcing agents may be added to the polymerisable thermoset composition. For example, fibrous reinforcing agents such as inorganic fibres that are manufactured according to the state of the art may be added as reinforcing agents. The polymerisable thermoset composition may contain carbon fibres, for example.

Based on the advantages offered by the polymerisable thermoset composition, the present embodiment also relates to a polymerised thermoset that represents a reaction product of the polymerisable thermoset composition as described herein.

The polymerised thermoset offers the advantage that it has good thermal resistance. In particular, the polymerised thermoset has improved thermal resistance compared with pure epoxy resins. Furthermore, the polymerised thermoset has a high glass transition temperature. In particular, the polymerised thermoset has a higher glass transition temperature than previously known CE/epoxy combinations.

The polymerised thermoset according to the embodiment typically has a glass transition temperature from 285° C. to 300° C.

In addition or alternatively thereto, the polymerised thermoset according to the embodiment has a curing temperature in a range from 100 to 180° C. The polymerised thermoset according to the embodiment preferably has a curing temperature in a range from 125 to 175° C.

In one embodiment of the present embodiment, the polymerised thermoset according to the embodiment has a density in a range from 1.20 to 1.35 g/cm$^3$ and preferably in a range from 1.25 to 1.30 g/cm$^3$.

In addition or alternatively thereto, the polymerised thermoset according to the embodiment has a water absorption capacity in a range from 1.2 to 1.35% by weight, based on the total weight of the polymerised thermoset.

In one embodiment of the present embodiment, the polymerised thermoset according to the embodiment has a decomposition temperature in a range from 350 to 400° C. and preferably in a range from 360 to 380° C.

A vertically suspended sample of the polymerised thermoset according to the embodiment that has been set alight preferably goes out within not more than 30 seconds, and release no burning droplets of molten plastic, as determined in the to the "Vertical Burn Test" according to DIN EN 60695-11-10.

A further aspect of the present embodiment relates to a process for manufacturing a polymerised thermoset, as described herein. The process comprises the steps of: providing a polymerisable thermoset composition as described herein, and polymerising the polymerisable thermoset composition at temperatures in a range from 100 to 180° C.

The polymerisable thermoset composition according to the embodiment may generally be provided by mixing the di- or polyfunctional organic cyanate ester resin, the naphthalene-based epoxy resin, the at least one phosphorus-containing phenol and/or the at least one phosphorus-containing epoxy and at least one diamine and optional additives, such as the at least one high-performance thermoplast. In one embodiment of the present embodiment, the polymerisable thermoset composition according to the embodiment is poured into a preferred mould or hollow space and is then polymerised in situ. Polymerisation takes place at temperatures in a range from 100 to 180° C. or from 125 to 175° C., for example at approximately 150° C., preferably for a total of 1 to 10 hours or for 2 to 5 hours. Polymerisation may be carried out in a single, continuous process or in multiple different and chronologically separate steps. Polymerisation is preferably carried out in a single, continuous process.

In one embodiment of the present embodiment, the process for manufacturing a polymerised thermoset comprises a post-curing step iii), in which the polymerised thermoset is post-cured. Post-curing takes place at temperatures in a range from 200 to 280° C. or from 200 to 250° C., for example at about 220° C., preferably for a total of 1 to 10 hours or for 2 to 5 hours. Post-curing may be carried out in a single, continuous process or in multiple different and chronologically separate steps. Post-curing is preferably carried out in a single, continuous process.

In view of the advantages offered by the polymerised thermoset according to the embodiment, the present embodiment also relates to the use of the polymerisable thermoset composition as described herein to manufacture lightweight construction components, preferably carbon fibre composites (CFRP). For example, the polymerised thermoset is used as a lightweight construction component in load-bearing lightweight construction elements that are exposed to thermal stresses, and are particularly exposed to elevated temperatures, for example temperatures higher than 200° C. In particular, the polymerised thermoset is used as a lightweight construction component in aerospace applications. For example, the polymerised thermoset is used as a lightweight construction component on satellites, rockets, aircraft such as passenger aeroplanes or helicopters, in rail vehicles such as trains, water vehicles such as passenger ships, or road vehicles such as cars.

A further aspect of the present embodiment therefore relates to a lightweight construction component, preferably carbon fibre composite (CFRP), which contains the polymerised thermoset as described herein.

As was explained earlier, polymerised thermosets may be obtained on the basis of the polymerisable thermoset composition according to the embodiment, which products are resistant to high temperatures and have a high glass transition temperature and good impact resistance. The polymerisable thermoset composition according to the embodiment may also be cured at moderate temperatures, and at the same time has improved resistance to hydrolysis. The polymerisable thermoset composition according to the embodiment also contains no curing agents and/or catalysts that are hazardous to health.

EXAMPLES

Methods a.) DSC measurements were taken with the aid of the "DSC Q2000" device made by TA Instruments. The spectra were recorded using the "Thermal Advantage Release 5.4.0" software and analysed using the "Universal Analysis 2000, Version 4.5A" software produced by TA Instruments. The heating rate was 5 K/min at a temperature from 20° C. to 350° C.

b.) TGA measurements were taken with the aid of the "TGA Q5000" device made by TA Instruments. The spectra were recorded using the "Thermal Advantage Release 5.4.0" software and analysed using the "Universal Analysis 2000, Version 4.5A" software produced by TA Instruments. The heating rate was 10 K/min, at a temperature from 20° C. to 1000° C. Each measurement was carried out both in an inert gas atmosphere (N2) and in an oxygen atmosphere (ambient air).

c.) DMA and rheology measurements Viscosity measurements and determination of glass transition temperatures (Tg) of the materials were carried out using the "Advanced Rheometric Expansion System (ARES)" rheometer manufactured by Rheometric Scientific. For analysis, the software "Rheometric Scientific, Version V6.5.8" was used. The heating rates were 3 K/min in all cases. Glass transition corresponds to the maximum of the tan(δ) function.

d.) UL-94 flammability test. The flammability properties of the materials were determined in accordance with DIN EN 60695-11-10, using the "Vertical Burn Test". The flame treatment time lasted for up to 60 sec.

2. Materials Used:

Primaset® PT15 (available from Lonza) is an oligo(3-methylene-1,5-phenylcyanate).

Epiclon® HP-4710 (available from DIC Corporation) is an oligo(1,1',5,5'-bis-(2,7-diglycidyloxy-1-naphthyl) methane) with an EEW of 170 g/eq.

Epiclon® HFC-X (available from DIC Corporation) is an organophosphorous phenolic resin with an OH equivalent weight of 428 g/eq and a phosphorus content of 10.4% by weight.

XP3775 (available from Schill+Seilacher "Struktol" GmbH) is a DOPO-modified Novolak with a phosphor content of 7.5% by weight and a EEW <2000 g/eq.

Fyrol® PMP (available from ICL) is a poly(m-phenylmethylphosphonate) with a phosphor content of 17.5%.

Core-Shell Particles:

Albidur® EP 5341 is a dispersion of an elastomer with high-performance capabilities in a cycloaliphatic epoxy resin with a silicone rubber content of 40% by weight and a EEW von 225-255 g/eq.

Albidur® EP 2240A is a dispersion of an elastomer with high-performance capabilities in an epoxy resin based on bisphenol A with a silicone rubber content of 40% by weight and a EEW von 290-315 g/eq.

Albidur® XP10669 s a dispersion of an elastomer with high-performance capabilities in a cyanate ester consisting of 4,4'-ethylidene diphenyldicyanate. The silicone rubber content is 40% by weight and the content of 4,4'-ethylidene diphenyldicyanate is 60% by weight.

Presentation of the Materials:

The resins Primaset PT15, Epiclon HP 47110, the corresponding organophosphorous modifier and the corresponding impact modifier are weighed in together and then melted in a convection oven and homogenised with a dispersing agent at 80° C. Then, the mixture is first degassed in the vacuum oven for 2 hours at 80° C. and then degassed for 1 hour at 110° C. The hot thermoset mixture is then poured into an aluminium casting mould that has been preheated to 130° C., and undergoes the following heating cycle:

1.) 130° C.→160° C. (ramp=2K/min)
2.) Maintain at constant temp. 160° C. for 4 hours
3.) 160° C.→30° C. (ramp=3K/min)
4.) free-standing post-curing: 230° C. for 4 hours The results from the DSC tests show that the cured thermoset has a glass transition temperature from 285° C. to 300° C.

The characterisation of the flame retardant properties and of the DMA tests is described in the following.

For this purpose, blends of the composition PT15/HP4710/FSM were prepared. The mixture ratio of PT15/HP4710 was 1/0.5.

| Flame retardant | Wt. proportion FSM/wt % | UL-94 evaluation[1] | $T_g$/ ° C. | $T_{onset}$/ ° C. |
|---|---|---|---|---|
| HFC-X | 2.9 | Burns | 294 | 269 |
| HFC-X | 4.8 | Burns | 291 | 264 |
| HFC-X | 9.1 | V-0[2] | 281 | 249 |
| Fyrol ® PMP | 2.9 | Burns | 306 | 281 |
| Fyrol ® PMP | 4.8 | Burns | 288 | 260 |
| Fyrol ® PMP | 6.5 | V-1[3] | 293 | 267 |
| Fyrol ® PMP | 9.1 | V-1 | 283 | 254 |

[1]The flame treatment time did not exceed 60 s. All test samples could not be flamed for at least 12 sec, so all received the evaluation V-0 for t < 12 s.
[2]V-0 A vertically suspended test sample that was alight went out within 10 sec without releasing burning droplets of melted plastic.
[3]V-1: A vertically suspended test sample that was alight went out within 30 sec without releasing burning droplets of melted plastic.

The impact resistance modifications using core-shell particles are described below. For this, PT15/HP4710/HFC-X/Modifier blends were used. The composition of (PT15/HP4710)/HFC-X was in the ratio of: (1/0.5)/0.07. The quantity of impact modifier is listed in the following table.

| Modifier | Wt. proportion Modifier/wt % | Tg/° C. | Tonset/° C. |
|---|---|---|---|
| Albidur EP2240A | 9.1 | 285 | 258 |
| Albidur EP5340A | 9.1 | 289 | 264 |
| Albidur EP5340A | 13.8 | 284 | 257 |
| Albidur XP10669 | 9.1 | 291 | 265 |

What is claimed is:
1. A polymerisable thermoset composition, comprising:
   a polyfunctional organic cyanate ester resin,
   a naphthalene based epoxy resin, and
   at least one phosphorus-containing phenol, wherein the phosphorus-containing phenol contains one of the following structural units:

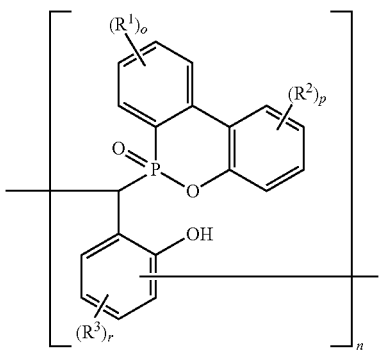

wherein
n is a number between 1 and 1000,
o is a number between 0 and 4,
p is a number between 0 and 4,
r is a number between 0 and 3,
$R^1$ is a $C_1$-$C_{10}$ alkyl,
$R^2$ is a $C_1$-$C_{10}$ alkyl, and
$R^3$ is a $C_1$-$C_{10}$ alkyl
or

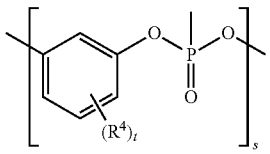

wherein
s is a number between 1 and 1000,
t is a number between 0 and 4, and
$R^4$ is a $C_1$-$C_{10}$ alkyl.

2. The polymerisable thermoset composition according to claim 1, wherein the polyfunctional organic cyanate ester resin is a cyanate having formula (IV):

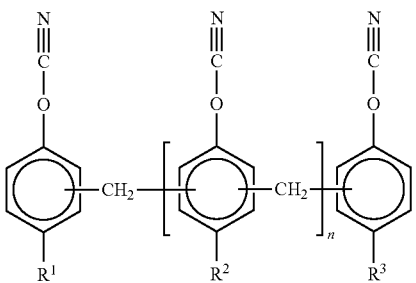

wherein $R^1$, $R^2$ and $R^3$ are each independently hydrogen or $C_1$-$C_{10}$ alkyl, and n represents an integer from 0 to 20.

3. The polymerisable thermoset composition according to claim 1, wherein the naphthalene-based epoxy resin represents a polymeric naphthalene-based epoxy resin.

4. The polymerisable thermoset composition according to claim 1, wherein the polymerisable thermoset composition comprises at least one high-performance thermoplast that is selected from the group consisting of polysulfone (PSU), polyethersulfone (PES), polyphenylene sulfone (PPSU), polyetherimide (PEI), polycarbonate (PC) and silicone rubber.

5. A polymerised thermoset constituting a reaction product of the polymerisable thermoset composition according to claim 1.

6. The polymerised thermoset according to claim 5, wherein the thermoset has a glass transition temperature from 285° C. to 300° C. and/or curing temperature in a range from 100 to 180° C.

7. A process for manufacturing a polymerised thermoset according to claim 5, comprising the steps of:
i) providing a polymerisable thermoset composition according to claim 1, and
ii) polymerising the polymerisable thermoset composition at temperatures in a range from 100 to 180° C.

8. The polymerisable thermoset composition according to claim 1, further comprising at least one phosphorus-containing epoxy and at least one diamine.

9. The polymerisable thermoset composition according to claim 8, wherein the phosphorus-containing epoxy contains 9-dihydro-9-oxa-10-phosphaphenanthrene-10-oxide as the structural unit.

10. The polymerisable thermoset composition according to claim 8, wherein the phosphorus-containing epoxy contains the following structural unit (III):

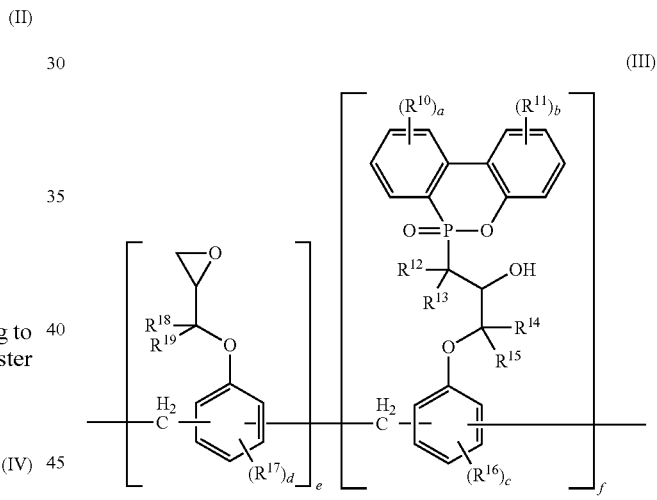

wherein
a is a number between 0 and 4,
b is a number between 0 and 4,
c is a number between 0 and 3,
d is a number between 0 and 3,
e is a number between 1 and 1000,
f is a number between 1 and 1000,
$R^{10}$ is a $C_1$-$C_{10}$ alkyl,
$R^{11}$ is a $C_1$-$C_{10}$ alkyl,
$R^{12}$ is a $C_1$-$C_{10}$ alkyl or hydrogen,
$R^{13}$ is a $C_1$-$C_{10}$ alkyl or hydrogen,
$R^{14}$ is a $C_1$-$C_{10}$ alkyl or hydrogen,
$R^{15}$ is a $C_1$-$C_{10}$ alkyl or hydrogen,
$R^{16}$ is a $C_1$-$C_{10}$ alkyl,
$R^{17}$ is a $C_1$-$C_{10}$ alkyl,
$R^{18}$ is a $C_1$-$C_{10}$ alkyl or hydrogen, and
$R^{19}$ is a $C_1$-$C_{10}$ alkyl or hydrogen.

* * * * *